Dec. 30, 1941.  W. C. OSTERHOLM  2,267,944
CUTTING MACHINE
Filed July 28, 1938  2 Sheets-Sheet 1

INVENTOR
WILLIAM C. OSTERHOLM

Dec. 30, 1941.  W. C. OSTERHOLM  2,267,944
CUTTING MACHINE
Filed July 28, 1938  2 Sheets-Sheet 2
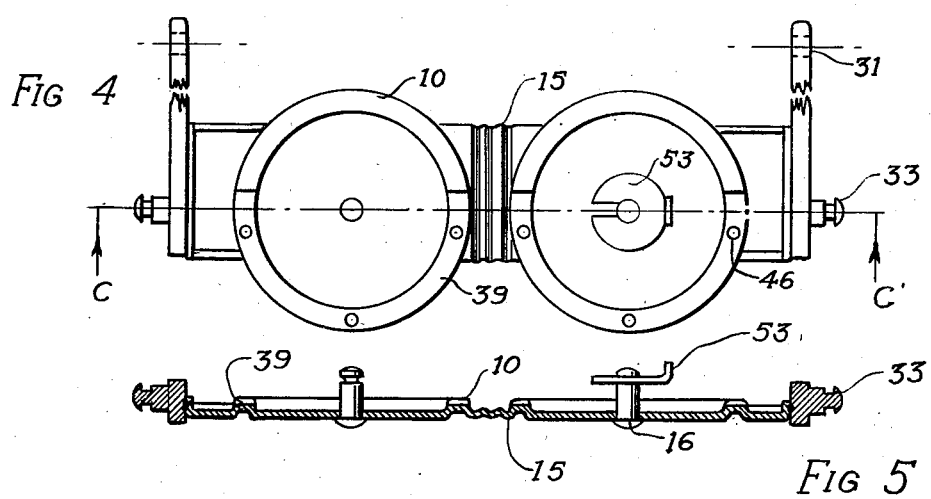
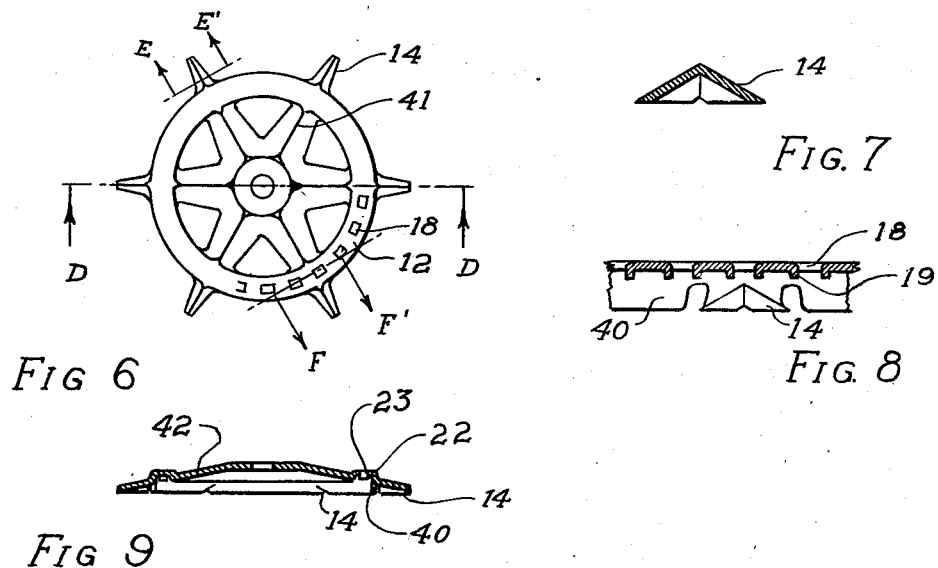
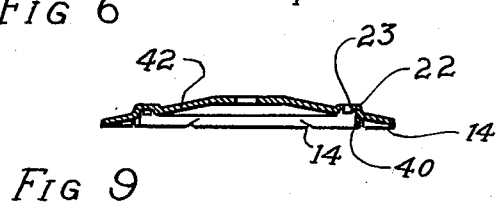
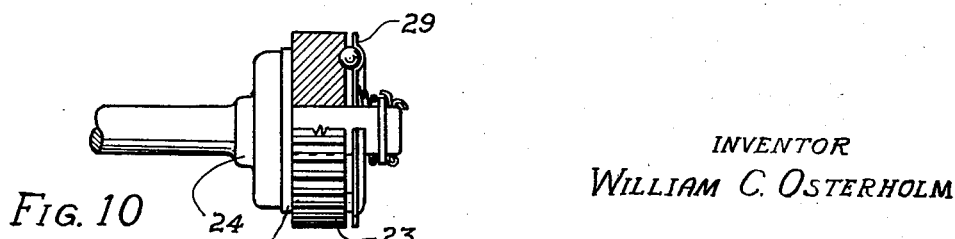
INVENTOR
WILLIAM C. OSTERHOLM Patented Dec. 30, 1941

2,267,944

UNITED STATES PATENT OFFICE 2,267,944

CUTTING MACHINE

William C. Osterholm, Oak Park, Ill.

Application July 28, 1938, Serial No. 221,808

10 Claims. (Cl. 56—255)

My invention relates to a cutting machine for mowing lawns, cutting weeds and grass, and consists in a modification of well-known circular rotating cutting wheels having a plurality of cutting blades fixed thereon in combination with a plurality of fingers, said fingers supporting the grass or weeds against the rotation of said cutting blades causing a clean shearing and cutting action.

It is an object of this invention to construct a device wherein when the cutting members become worn, the cutting wheels may be quickly and economically replaced.

It is another object of this invention to construct a cutting device wherein the grass or weeds, after cutting, may be easily gathered in a receptacle attached to the cutting machine.

It is another object of this invention to construct a cutting machine having circular rotating cutting wheels at extremely low cost, and which is very light in weight.

It is another object of this invention to utilize the circular rotating cutting wheels as part of the gear mechanism for rotating said cutting wheels.

Anoher object of this invention is to construct a cutting machine which can be either manually or power operated and which is extremely light weight.

Another object of this invention is to construct a cutting machine for cutting grass and/or weeds which will cut very close to trees, stones and other objects.

With these and other objects in view, which will appear as the description proceeds, my invention consists in the construction and arrangement of parts hereinafter described and claimed.

In the accompanying drawings which form a part of this specification, I have illustrated a convenient and practical embodiment of my invention and referring now to the accompanying drawings in which:

Fig. 4 shows a top view of the comb frame and the flexible cutter wheel support.

Fig. 5 shows a side view of the comb frame and flexible cutter wheel support.

Fig. 6 shows a top view of the circular cutter wheel.

Fig. 7 shows a cross section of the cutting blade which may be an integral part of the circular cutter wheel or a separate part fastened to the circular cutter wheel.

Fig. 8 shows a side view of the circular wheels with the cutting blade and holes cooperating with the driving mechanism.

Fig. 9 is another cross sectional view of the circular cutter wheels having strengthening and grass throwing ribs.

Fig. 10 shows a cross sectional view of the frictional driving means.

Figures 1, 2, 3:
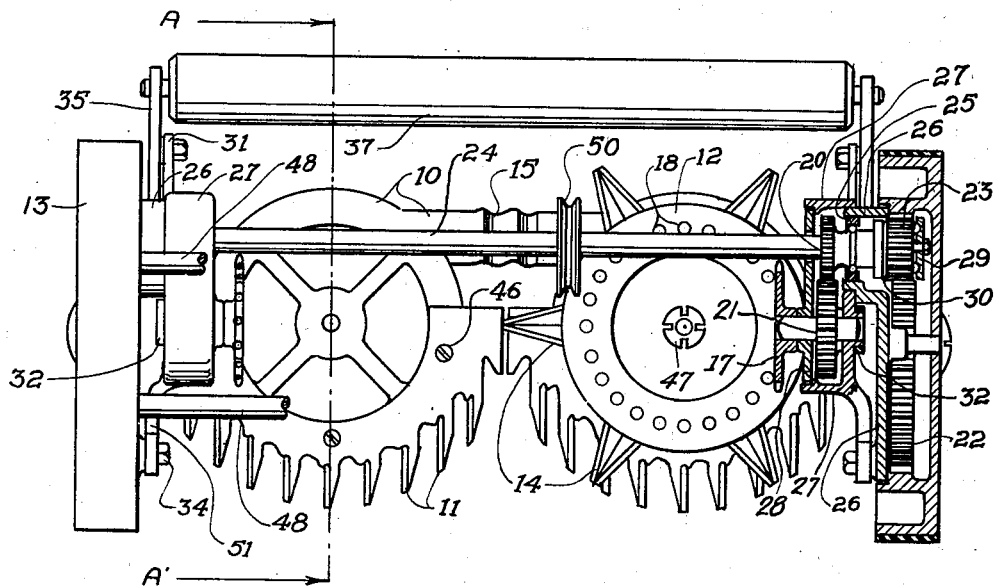
Fig. 1 shows a top view of my cutting machine with driving mechanism, cutting wheels, and other parts.
Fig. 2 shows the end view of my cutting machine with the cutter wheels, driving mechanism, and adjusting means.
Fig. 3 shows the pivotal comb support in operating and disconnected position.

Referring now to the different figures of the drawings, 10 is the frame carrying the comb 11, supporting the circular cutting wheels 12. The frame 10 is supported by the wheels 13 operatively connected to each end of frame 10, the circular cutting wheels having cutter blades 14, either made integral with the circular wheels, or separately formed by stamping or forging, and fastened by any well known means, to the circular cutting wheels 12.

The cutter blades 14 are dished in the central portion thereof to provide a cutting edge and to prevent undue friction between the cutter blades and comb 11 which is preferably made from a stamping having projections extending outwardly, said projections being slightly dished to reduce friction and to provide a cutting edge cooperating with the edge of the cutter blades 14, several of which are made integral with, or fastened to the cutting wheels 12. The cutting wheels 12 are preferably formed by stamping and are of dished shape formation to provide a minimum surface contacting with the supporting comb 11 and the projection members thereon.

The comb frame 10 is preferably formed with a flexible portion 15 in the central portion thereof providing a means wherein the circular cutter wheels may be automatically adjusted to irregularities of the ground.

The circular cutting wheels 12 are detachably mounted upon the comb frame 10 by the pin 16 and the key 53 which is frictionally held in a groove formed in pin 16.

The circular cutting wheels 12 are rotated by driving sprocket 17 which is formed with teeth cooperating with the holes 18 formed in the circular cutting wheels 12. The holes 18 are preferably formed by pressing the metal from the holes downwardly forming lips 19 which contact with the teeth formed on the sprocket 17, said lips being properly shaped to provide the correct contact with the wearing surfaces with the teeth on sprocket 17.

Sprocket 17 is rotated by gear 20 meshing with gear 21. Gear 20 is rotated by gear 22 meshing with pinion gear 23 which is frictionally mounted on driving shaft 24. Shaft 24 may be driven through pulley 50 by any suitable source of power or through driving gear 22 and gear 23, by the wheels 13.

The shaft 24 is supported by bearings 25 mounted in housing 26. The gear casing 27 is preferably mounted upon the housing 26. The cover 28 is part of the gear housing 26. The shaft 24 is frictionally attached to pinion gear 23 by pressure plate 29 frictionally engaging friction disc 30.

The comb frame 10 is adjustably supported by arms 31 which are pivotally mounted to the housing 26 and which is held in operating position by hooks 32 providing means whereby the entire comb frame 10 with the circular cutter assembly may be pivotally disconnected as shown in Figure 3 numeral 31a, providing means whereby the circular cutter wheels 12 may be removed and reversed to provide a new cutting edge. As the circular cutter wheels 12 rotate in a clockwise and counter-clockwise direction when the circular cutter wheels are reversed, a new cutting edge is provided on the blades 14, or the wheels may be entirely replaced by new inexpensive wheels. In either case, the adjustment of the teeth and sprocket 17 in relation to the lips 19 formed in the circular cutter wheels is not disturbed, as when the pivotal arm 31 is again placed back in operating position by hooking hook 32 in engagement with pin 33 the sprocket 17 returns to the same adjustment as it was in before the pivotal arm 31 was moved.

The circular cutting wheels 12 are held in engagement with the comb member 11 by the spring washer 47 cooperating with key 53 providing means wherein the circular cutter wheels always have the desired pressure upon the comb member 11 without causing undue friction.

From the above description it will be apparent that the present cutting machine embodies an outer carriage or frame supported by the wheels and an inner carriage or cutting element supporting frame pivoted thereto, the cutting element mounted upon said second frame having a flexible drive connection adjustable with respect to the first-named frame whereby the pitch line of the gears for the drive remains the same irrespective of the adjustment of the second frame. To secure this operation, it is to be noted that the outer frame comprises members 26 of the wheel housings which are provided with the rearwardly extending arms 35. This frame structure with respect to the wheels is adjusted through the medium of roller support 38. The comb frame 10 upon which cutter elements 12 are mounted is provided with rearwardly disposed arms 31 pivotally mounted upon the arms 35 of the outer frame or carriage. The forward part of the comb or inner frame 10 is releasably connected to the gear housings or casings 27 of the inner frame structure by way of the hooks 32.

The gear housings or casings 27 are pivotally movable about the axis of shaft 24 and are provided with the arms 51 adjustably secured by means of the bolts 34 to the members 26 of the wheel housings.

Thus, when it is desired to adjust the cutting height of the cutting element 12, bolts 34 are loosened and arms 51 adjusted, after which bolts 34 are again tightened to secure the arms 51 in adjusted position with respect to the members 26. Movement of arms 51, through the housings 27, either raises or lowers the outer or forward ends of the inner carriage or frame 10 upon which cutting elements 14 are mounted. This adjustment does not in any way affect the pitch line of the drive gears for sprocket 17. Adjustment of roller support 38 may be desired to adjust the cutting elements to the horizontal after an adjustment as above described.

The comb frame 10 is provided with raised circular projections 39 forming a support for the circular cutting wheels 12. The circular cutting wheels 12 are also provided with bearing surface 40 which rotates upon the raised projections 39. The circular cutter wheels 12 are preferably made of stampings having a plurality of spaced ribs 41, said ribs having centrally raised portions which operate to carry the grass cut by the machine in a clockwise and counter-clockwise direction thereby moving the cut grass in a backward direction into a receiver (not shown) which may be fastened to the cutting machine in any convenient manner.

It is to be understood that the driving mechanism of my machine consists of one set of driving mechanisms on each side of the machine, each of said sets of driving mechanisms being differentially operated. The brace rods 48 provide a convenient support for any means which it may be desired to use for driving pulley 50 and likewise provide means for bracing the driving mechanism on each side of the cutting machine.

In operation my improved cutting machine when moved in a forward direction, the comb 11 separates and supports the grass, the cutting edge formed on comb 11 being on the side of the projection toward the rotation of the cutter blade 14 which provides a clean shearing effect by the projections on the comb and the blades on the circular cutting wheels, and due to the comparatively high speed of rotation of the circular cutting wheels, a smooth clean cutting surface of any desired height is obtained.

What I claim is:

1. In a cutting machine, the combination of a frame, wheels for supporting said frame, means for pivotally mounting said frame with respect to said wheels, a cutting wheel rotatably mounted on said frame, drive means pivotally mounted with respect to said wheels and movable in accordance with the movement of said frame, said drive means having a driving element, and said driving element and said cutting wheel having means cooperating at the face of the latter and adjacent its periphery whereby said wheel is driven in any adjusted position of said frame.

2. In a cutting machine, the combination of a frame, wheels for supporting said frame, means for mounting said frame with respect to said wheels, a cutter element supporting frame pivoted adjacent one end to said first-named frame, and means adjacent the other end of said frame for releasably holding said second-named frame in position with respect to said first-named frame.

3. In a cutting machine, the combination of a frame, wheels for supporting said frame, means for mounting said frame with respect to said wheels, a cutter element supporting frame pivoted adjacent one end to said first-named frame, drive means pivotally mounted with respect to said wheels and movable in accordance with the movement of said cutter frame, a cutter element rotatably supported on said cutter frame, and means adjacent the other end of said cutter frame for releasably holding said second-named frame in position with respect to said first-named frame whereby said element is operatively driven by said drive means.

4. In a cutting machine, the combination of a frame, wheels for supporting said frame, means for mounting said frame with respect to said wheels, a cutter wheel supporting frame pivoted adjacent one end to said first-named frame, drive means pivotally mounted with respect to said wheels and movable in accordance with the movement of said cutter frame, said drive means including a driving element, a cutter wheel rotatably supported on said cutter frame and having means adjacent the periphery thereof at one of its faces cooperating with said driving element, and means adjacent the other end of said frame for releasably holding said second-named frame in position with respect to said first-named frame whereby said wheel is operatively driven by said driving element when positioned by said holding means.

5. In a cutting machine, the combination of a frame, wheels for supporting said frame, means for pivotally mounting said frame with respect to said wheels, a cutting element rotatably mounted on said frame, drive means pivotally mounted with respect to said wheel and movable in accordance with the movement of said frame, said drive means including a drive element at the pivot for said drive means, a second drive element swingable with said frame and driven by said first named element, said second named driving element having means cooperating with said cutting element for driving the same in any adjusted position of said frame.

6. In a cutting machine, the combination of a frame, wheels for supporting said frame, means for mounting said frame with respect to said wheels, a cutter wheel supporting frame pivoted adjacent one end to said first named frame, means adjacent the other end of said cutter wheel supporting frame for detachably securing the same to said first named frame, a cutter wheel rotatably mounted on said cutter wheel supporting frame, drive means pivotally mounted with respect to said cutter wheel and movable in accordance with the movement of said second named frame, said drive means including a drive element at the pivot for said drive means, a second drive element swingable with said second named frame and driven by said first named element, said second named driving element having means cooperating with said wheel for driving the same in any adjusted position of said second named frame.

7. In a cutter machine, the combination of an outer frame, wheels for support of said frame, an inner cutter element supporting frame adjustably mounted on said outer frame, a cutter element mounted on said inner frame, drive means for said cutter element pivoted with respect to said outer frame and operatively connected in driving relation to said cutter element in any of the adjusted positions of said inner frame, and means for pivotally adjusting said driving means and securing the same in said adjusted position.

8. In a cutter machine, the combination of an outer frame, wheels for support of said frame, an inner cutter element supporting frame pivotally mounted on said outer frame, a cutter element mounted on said inner frame, a drive element fixed with respect to said outer frame, and a flexible adjustable driving connection between said drive element and said cutter element for driving said cutter element in any of its pivotally adjusted positions with respect to said outer frame.

9. In a cutter machine, the combination of an outer frame, wheels for support of said frame, an inner cutter element supporting frame pivotally mounted adjacent one end on said outer frame, a cutter element mounted on said inner frame adjacent its other end, a drive element fixed with respect to said outer frame, and means for connecting said other end to said outer frame in various adjusted positions with respect to its pivotal mounting on said inner frame, said connecting means including drive means in operative driving relation to said drive element and cutter element and adjustable in accordance with the adjustment of said inner frame to maintain said driving relation with said cutter element in any of its adjusted positions.

10. In a cutter machine, the combination of an outer frame characterized by including spaced wheel supporting members and laterally extending arms, wheels mounted on said members, an inner cutter element frame pivoted to said arms, a cutter element mounted on said inner frame, a drive element fixed with respect to said outer frame and eccentrically disposed with respect of the mountings for said wheels on said members, and an adjustable connection between said inner and outer frames for varying the pivotal relation thereof, said connection embodying drive means movable in accordance with the adjustment of said inner frame and having a driving connection with said drive element and said cutter element in all of said adjusted positions of said inner frame.

WILLIAM C. OSTERHOLM.